M. R. BLANK AND L. F. SITKIEWITZ.
CAN HANDLING DEVICE.
APPLICATION FILED MAR. 22, 1920.
1,350,984.
Patented Aug. 24, 1920.
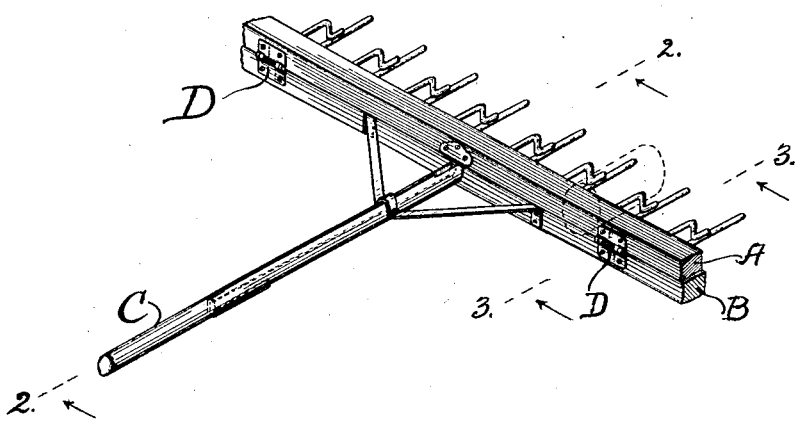
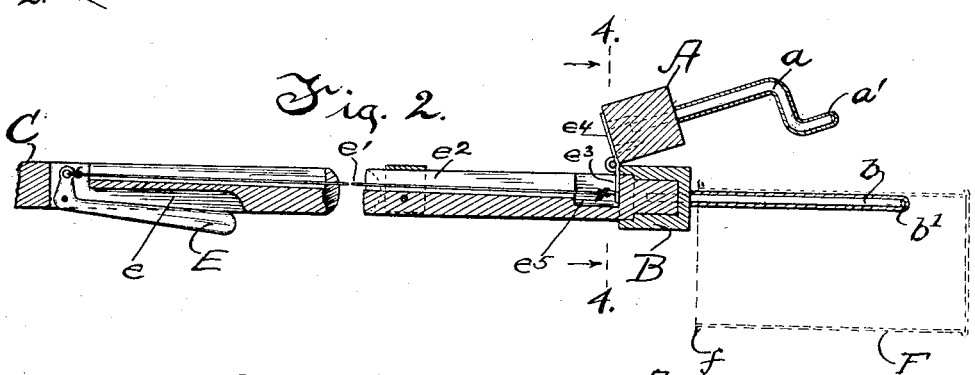
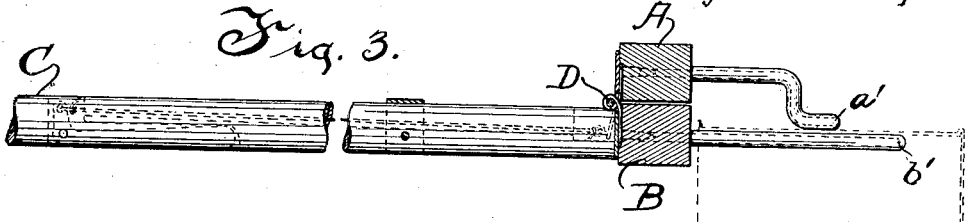
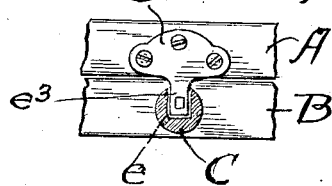
INVENTORS
Martin R. Blank, and
Louis F. Sitkiewitz.
By Erwin, Wheeler & Woolard,
ATTORNEYS.

UNITED STATES PATENT OFFICE.

MARTIN R. BLANK AND LOUIS F. SITKIEWITZ, OF THIENSVILLE, WISCONSIN.

CAN-HANDLING DEVICE.

1,350,984.            Specification of Letters Patent.     Patented Aug. 24, 1920.

Application filed March 22, 1920. Serial No. 367,647.

*To all whom it may concern:*

Be it known that we, MARTIN R. BLANK and LOUIS F. SITKIEWITZ, both citizens of the United States, and residents of the city of Thiensville, in the county of Ozaukee and State of Wisconsin, have jointly invented a certain new and useful Improvement in Can-Handling Devices; and we do declare the following to be a full, clear, and exact description thereof, such as will enable persons skilled in the art to which the invention relates to make and use the same, reference being had to the accompanying drawing for an illustration of one construction in which our invention has been embodied.

The invention relates to a device for handling a quantity of empty cans in an expeditious and sanitary manner.

As is well known to those conversant with the canning industry, the problem of expeditiously handling large numbers of empty cans in accordance with approved sanitary methods and without damage to the cans is a serious one. The empty cans are shipped from the point of their manufacture to the cannery and are corded in tiers in the cars by which they are transported. In view of the large number of cans constituting a shipment it is desirable that some means for rapidly unloading the cars be devised, and that such means enable this work to be done without personally handling the cans, or handling them in such manner as to damage them. In the old methods of personally handling the cans, many were damaged so as to render them unfit for the operation of the can sealing machines and this process was productive of a great loss not only of the cans but also of their contents, inasmuch as the damage to the cans was not ascertained until after they had been packed and passed through the sealing machine.

To meet the emergency we have constructed a device which is adapted to engage a plurality of cans at one time and permit their removal from the car without personal contact with the cans. Our improved device is constructed so that the cans are firmly held during the period of conveyance and cannot ordinarily be accidentally disengaged from the handling device, so that the damage which has heretofore resulted from loose or bulk handling is entirely eliminated.

Our invention resides in a device which is adapted to seize a comparatively large number of cans at one operation and permit their removal from the cords or stacks in the car, in such manner that the cans are firmly held while being transported to their place of storage in the cannery. The device has been constructed with provisions which coöperate with structural features of the can in such manner as to prevent their accidental displacement and consequent damage while being so transported.

The details of our invention will be hereinafter described, and pointed out in the appended claims.

In the drawings which form part of this specification,

Figure 1 is a perspective view from the rear showing our can handling device, broken off at the ends to save space, but illustrating its construction.

Fig. 2 is a sectional view on the line 2—2, Fig. 1, looking in the direction of the arrow.

Fig. 3 is a sectional view on the line 3—3, Fig. 1, also in the direction of the arrow.

Fig. 4 is an enlarged rear view of a detail of the construction which will be described, the view being taken on the sectional line 4—4, Fig. 2.

Our improved can handling device is composed of two principal members A and B, formed of wooden strips which may have a length up to about four feet and of suitable cross sectional dimensions. A handle C is tenoned in the lower bar B at a point midway of its length. The strips A and B are connected by spring hinges D at their rear, the springs normally tending to separate the contiguous faces of the bars in the manner indicated in Fig. 2.

A bell crank lever E is pivoted in an undercut slot $e$ in the handle C and to the short arm of the bell crank a connector $e^1$, resting in a groove $e^2$ formed in the upper side of the handle, leads to an arm $e^3$, depending from a plate $e^4$ securely attached to the rear side of a bar A, and working in a recess $e^5$ in the front end of the handle. Viewing Figs. 2 and 3, it will be seen that the arm $e^3$ of the plate $e^4$ is bent at an angle to the plane in which the plate lies so that the said arm $e^3$ acts as a stop to limit the separation of the bars A and B, under the influence of the springs, which may be formed as a part of the hinges D. The operator grasps the handle C with one hand at the rear of the bell crank, and by compressing the bell crank toward the handle with the other hand, the tension of the springs is overcome by the pull on the connector $e^1$, and the bars A and B are caused to lie with their contiguous faces in engagement with each other.

The lower bar B is provided with a series of projecting pins $b$ which may be provided with a resilient covering $b^1$. The upper bar A is provided with a series of curved fingers $a$, which likewise may be provided with a resilient covering $a^1$. The configuration of the curved fingers $a$ is such that when the bars A and B are caused to approach each other by pressure being applied to the bell crank E, the tips of the fingers $a$ will be brought into engagement with the upper surface of the pins $b$.

Figs. 2 and 3 show in dotted outlines an ordinary cylindrical can F of the type now generally used in canneries. This can is open at the top, and is provided with an outwardly projecting flange $f$, which is adapted to engage the cover of the can when the latter is crimped thereon. Normally, the fingers $a$ and pins $b$ are separated, so that the pins $b$ may be inserted in the open ends of the cans which are piled up in the car. This having been done, the operator compresses the bell crank E and causes the upper sides of the cans to be seized between the tips of the fingers $a$ and pins $b$. The pressure on the bell crank E is maintained so long as the cans are in transition. The pressure exerted will be sufficient to tightly grasp the cans and prevent their accidental dislodgment, and the flange at the top of each can will act to prevent any of them from sliding from their engagement between the fingers $a$ and pins $b$, even if there should be a slight relaxation of the holding pressure.

It is customary to place a traveling conveyer between the car in which the cans are shipped to the point of storage in the cannery. The row of cans held by the handling device may be placed upon the conveyer and the pressure of the fingers relaxed and the pins withdrawn from the cans. The same handling device may be used at the other end of the conveyer for lifting the cans and again cording them up for storage.

From the foregoing description it will be obvious that we have produced an improved can handling device which will enable large numbers of cans to be handled with great facility and with an absolute assurance that the cans will not be damaged in the process of handling and thus rendered unsuitable for canning purposes.

Having thus described our invention, what we claim and desire to secure by Letters Patent of the United States is:

1. A can lifting device provided with a row of pins designed for insertion in the open ends of a plurality of cans, fingers corresponding in number with the pins, and means for engaging the fingers with the exterior of the cans.

2. A can handling device comprising a bar provided with a row of pins designed for insertion in the open ends of a plurality of cans, a second bar hinged thereto and provided with fingers corresponding in number to the pins, means for rocking the hinged bar to cause the fingers to engage the exterior of the cans and clamp them against the pins of the lower bar.

3. A can handling device comprising a bar provided with a row of pins designed for insertion in the open ends of a plurality of cans, a second bar hinged thereto and provided with fingers corresponding in number to the pins, springs for normally separating the fingers and the pins to permit the insertion stated, and means for rocking the hinged bar to cause the fingers to engage the exterior of the cans and clamp them against the pins of the lower bar.

4. A can handling device comprising a bar provided with a row of pins designed for insertion in the open ends of a plurality of cans, a second bar hinged thereto and provided with fingers corresponding in number to the pins, springs for normally separating the fingers and the pins to permit the insertion described, a stop to limit the extent of such separation, and means for rocking the second bar to engage the fingers thereof with the exterior of the cans and clamp them against the pins of the lower bar.

5. A can handling device comprising a bar provided with a row of pins designed for insertion in the open ends of a plurality of cans, a second bar hinged thereto and provided with fingers corresponding in number to the pins, springs for normally separating the fingers and the pins to permit the insertion described, a stop attached to the upper bar and adapted to be brought by the action of the springs into engagement with the lower bar to limit the extent of such separation, and means connected with the stop for rocking the bar to bring the fingers into engagement with the exterior of the cans and clamp them against the pins of the lower bar.

6. A can handling device comprising two hinged bars, one of which is provided with pins adapted for insertion into the open ends of a plurality of cans, and the other of which is provided with a series of fingers adapted for engagement with the exterior of the cans and to clamp them against the pins of the lower bar, means for normally separating the bars, and means for effecting the engagement of the fingers and pins with the cans as described.

7. A can handling device provided with means for simultaneously engaging the interior of a plurality of open-end cans, and means for engaging in like manner the exterior of said cans, whereby the latter are held from disengagement from the device during transferring movement of the cans.

8. A can handling device provided with a row of pins adapted for insertion in the open ends of a plurality of cans, a row of fingers for engaging the exterior of the cans and clamping them upon the pins, and means for relatively moving the fingers and pins to positively grip the cans and hold them against displacement during the transferring movement of the cans.

9. A can handling device provided with a row of pins adapted for insertion in the open ends of a plurality of cans to engage the interior thereof, means for engaging the exterior of the cans, to hold them upon the said pins and against displacement during the transferring movement of the cans, and means for effecting the normal separation of the can engaging elements.

10. A can handling device provided with relatively movable members adapted to simultaneously engage the interior and exterior of a plurality of cans so as to hold the latter against displacement during the transferring movement of such plurality of cans, and means for moving the said members as described to effect the said engagement.

11. A can handling device provided with movable members for engaging the exterior and interior of a plurality of open-end cans, means for effecting a normal separation of such members to permit their application to the cans, and means to cause the said members to approach the cans to effect the engagement described, whereby the cans are positively held against displacement during their transferring movement.

12. A can handling device provided with separable sets of members adapted to simultaneously engage the interior and exterior of a plurality of open-end cans, and means for effecting relative movement of the said members to grip the cans as described and hold them against displacement during the transferring movement of the cans.

13. A can handling device provided with coöperating members for engaging the interior and exterior of a plurality of open-end cans, and means for actuating the said members to effect the engagement described, whereby the cans are gripped and held against displacement during the transferring movement of the cans.

In testimony whereof we have signed our names at Milwaukee this 13th day of March, 1920.

M. R. BLANK.
LOUIS F. SITKIEWITZ.

Witnesses:
W. F. WOOLARD,
J. MOSS.